United States Patent
Blum et al.

(10) Patent No.: US 8,565,125 B2
(45) Date of Patent: Oct. 22, 2013

(54) SERVICES BASED TWO WAY VOICE SERVICE RECORDING AND LOGGING

(75) Inventors: William R. Blum, Huntington Station, NY (US); Michael Everald Barrett, Freeport, NY (US)

(73) Assignee: Honeywell International Inc., Morristown, NJ (US)

( * ) Notice: Subject to any disclaimer, the term of this patent is extended or adjusted under 35 U.S.C. 154(b) by 735 days.

(21) Appl. No.: 12/511,292

(22) Filed: Jul. 29, 2009

(65) Prior Publication Data

US 2011/0028116 A1 Feb. 3, 2011

(51) Int. Cl.
*H04L 12/16* (2006.01)
*H04Q 11/00* (2006.01)
*H04M 3/56* (2006.01)
*H04M 7/00* (2006.01)

(52) U.S. Cl.
CPC ............... *H04M 3/56* (2013.01); *H04M 7/006* (2013.01); *H04M 3/562* (2013.01)
USPC ........ 370/261; 370/259; 370/260; 370/395.2; 379/156; 379/157; 379/158; 379/202.01; 379/203.01; 379/204.01; 379/205.01; 379/206.01; 379/207.01; 455/416

(58) Field of Classification Search
None
See application file for complete search history.

(56) References Cited

U.S. PATENT DOCUMENTS

| | | | |
|---|---|---|---|
| 5,815,550 A * | 9/1998 | Miller | 379/37 |
| 5,896,565 A * | 4/1999 | Miller | 455/404.1 |
| 6,175,307 B1 * | 1/2001 | Peterson | 340/531 |
| 6,366,646 B1 * | 4/2002 | Miller | 379/40 |
| 6,466,258 B1 * | 10/2002 | Mogenis et al. | 348/143 |
| 6,542,602 B1 * | 4/2003 | Elazar | 379/265.06 |
| 6,553,025 B1 * | 4/2003 | Kung et al. | 370/352 |
| 6,658,091 B1 * | 12/2003 | Naidoo et al. | 379/37 |
| 6,823,054 B1 * | 11/2004 | Suhm et al. | 379/134 |
| 6,879,685 B1 * | 4/2005 | Peterson et al. | 379/265.11 |
| 6,882,723 B1 * | 4/2005 | Peterson et al. | 379/265.01 |
| 6,898,277 B1 * | 5/2005 | Meteer et al. | 379/265.02 |
| 6,904,143 B1 * | 6/2005 | Peterson et al. | 379/265.01 |
| 6,922,466 B1 * | 7/2005 | Peterson et al. | 379/88.09 |
| 6,937,705 B1 * | 8/2005 | Godfrey et al. | 379/88.18 |
| 6,970,554 B1 * | 11/2005 | Peterson et al. | 379/266.1 |
| 7,003,079 B1 * | 2/2006 | McCarthy et al. | 379/32.01 |
| 7,039,166 B1 * | 5/2006 | Peterson et al. | 379/88.18 |
| 7,046,985 B2 * | 5/2006 | Seales et al. | 455/404.1 |
| 7,158,026 B2 * | 1/2007 | Feldkamp et al. | 340/531 |
| 7,305,082 B2 * | 12/2007 | Elazar et al. | 379/265.07 |
| 7,474,633 B2 * | 1/2009 | Halbraich et al. | 370/259 |
| 7,920,841 B2 * | 4/2011 | Martin et al. | 455/404.1 |
| 7,920,842 B2 * | 4/2011 | Martin et al. | 455/404.1 |
| 7,920,843 B2 * | 4/2011 | Martin et al. | 455/404.1 |
| 7,965,821 B2 * | 6/2011 | Bouchard et al. | 379/68 |
| 8,022,807 B2 * | 9/2011 | Martin et al. | 340/5.2 |
| 2002/0027977 A1 * | 3/2002 | Noguchi | 379/67.1 |
| 2003/0142805 A1 * | 7/2003 | Gritzer et al. | 379/202.01 |
| 2004/0086093 A1 * | 5/2004 | Schranz | 379/37 |

(Continued)

*Primary Examiner* — Ayaz Sheikh
*Assistant Examiner* — Peter Chau
(74) *Attorney, Agent, or Firm* — Husch Blackwell

(57) ABSTRACT

A method and apparatus are provided for recording an exchange between a central monitoring station and a protected premises. The method includes the steps of transmitting an alarm notification from a protected premises to an alarm routing service, the alarm routing service establishing a voice connection between the protected premises and a central monitoring station in response to the alarm notification and the alarm routing service recording audio on the voice connection between the protected premises and the central station.

15 Claims, 1 Drawing Sheet

(56) References Cited

U.S. PATENT DOCUMENTS

| | | | |
|---|---|---|---|
| 2005/0018622 A1* | 1/2005 | Halbraich et al. | 370/260 |
| 2005/0123115 A1* | 6/2005 | Gritzer et al. | 379/202.01 |
| 2005/0141674 A1* | 6/2005 | Brown et al. | 379/32.01 |
| 2005/0174229 A1* | 8/2005 | Feldkamp et al. | 340/506 |
| 2005/0175156 A1* | 8/2005 | Afshar et al. | 379/35 |
| 2005/0242945 A1* | 11/2005 | Perkinson | 340/531 |
| 2005/0242948 A1* | 11/2005 | Tarr | 340/539.22 |
| 2006/0239250 A1* | 10/2006 | Elliot et al. | 370/352 |
| 2007/0182540 A1* | 8/2007 | Marman | 340/506 |
| 2007/0183403 A1* | 8/2007 | Somers | 370/352 |
| 2008/0309449 A1* | 12/2008 | Martin et al. | 340/3.1 |
| 2008/0309450 A1* | 12/2008 | Martin et al. | 340/3.1 |
| 2008/0311878 A1* | 12/2008 | Martin et al. | 455/404.1 |
| 2008/0311879 A1* | 12/2008 | Martin et al. | 455/404.1 |
| 2009/0323904 A1* | 12/2009 | Shapiro et al. | 379/39 |
| 2011/0183643 A1* | 7/2011 | Martin et al. | 455/404.1 |

* cited by examiner

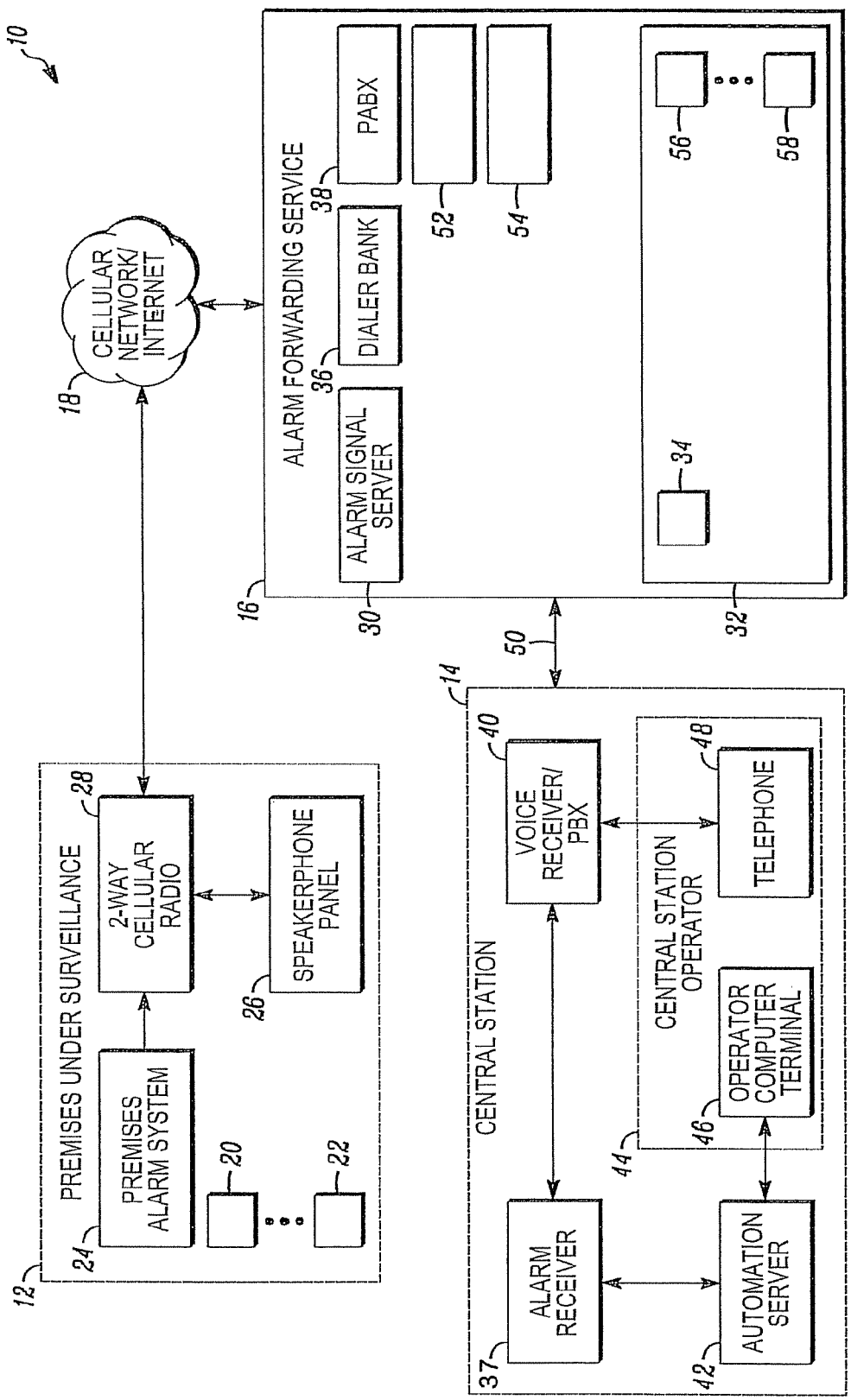

SERVICES BASED TWO WAY VOICE SERVICE RECORDING AND LOGGING

FIELD OF THE INVENTION

The field of the invention relates to security systems and more particularly to methods used in communicating between protected premises and central monitoring stations.

CROSS REFERENCE TO RELATED APPLICATIONS

This application is related to commonly-owned, co-pending U.S. patent application Ser. No. 12/110,883 filed on Apr. 28, 2008 and application Ser. No. 11/834,414 filed on Aug. 6, 2007, the entire contents and disclosure of which are expressly incorporated by reference as if fully set forth herein.

BACKGROUND OF THE INVENTION

Security systems are generally known. Such systems generally include a protected premises and a central monitoring station. The protected premises are each typically provided with an alarm panel and a number of sensors (e.g., door and window switches, motion detectors, etc.).

In the event of an intrusion, one of the sensors may detect the intruder and send a signal to an alarm panel. In response, the alarm panel may send an alarm notification to the central monitoring station. The alarm notification is typically a digital signal sent over local telephone lines to the central station. In response to receipt of an alarm notification, the central station may take any of a number of actions including notifying the police.

However, many alarm notifications may be accidental. In some cases, homeowners may enter a protected premises and forget to disengage the alarm. In order to avoid false alarms, it often becomes necessary for the central station to place a telephone call to the protected premises in order to confirm the need for the police. In such cases, an attendant may ask the person answering the call to provide a password in order to cancel the alarm.

If the homeowner does not respond with the proper password or if other problems are apparent through the voice connection, then the attendant must make a decision as to whether to request police assistance. However any decision made by the attendant is based upon the judgment of the attendant and often exposes the central station monitoring system to the consequences of improper decisions. Because of the importance of security system, a need exists for better methods of reducing the liability associated with telephone calls to protected premises in response to alarms.

BRIEF DESCRIPTION OF THE DRAWINGS

FIG. 1 is a block diagram of an alarm system in accordance with an illustrated embodiment of the invention.

DETAILED DESCRIPTION OF AN ILLUSTRATED EMBODIMENT

FIG. 1 is a block diagram of a security system 10 shown generally in accordance with an illustrated embodiment of the invention. Included within the system 10 is a protected premises 12 and a central alarm monitoring station 14. Also included within the alarm system 10 is an alarm reporting service (e.g., AlarmNet) 16 that reports alarms to the central monitoring station 15 through a cellular network and/or the Internet 18.

Included within the protected premises 12 may be a number of intrusion sensors (e.g., door or window switches, motion detectors, etc.) 20, 22 connected to an alarm panel 24. Also included within the protected premises 12 is a cellular transceiver 28.

Upon start-up of the alarm panel 24, a serviceman may program the alarm panel 24 with a set of operational features that allow the alarm panel 24 to report alarms to the central monitoring station 14. The serviceman identifies the intrusion detectors 20, 22 to the panel and their location. The serviceman may also enter a communication system address (e.g., a telephone number, URL, etc.) of the alarm reporting service 16 in order to allow the alarm panel 24 to properly route alarm messages to the alarm reporting service 16.

The serviceman may also identify a communication system address (e.g., telephone number, URL, etc.) of the alarm panel 24 and also a premises identifier (e.g., an account number, address, etc.). The communication system address allows the alarm panel 24 to receive messages intended for the alarm panel 24. The premises identifier allows the alarm reporting service 16 to identify an associated central monitoring station 14 of the premises 12 from the content of any received alarm messages.

Upon activation of one of the intrusion sensors 20, 22, the alarm panel 24 may enter an alarm state. If the activated sensor 20, 22 is a main entrance of the premises 12, then the alarm panel 24 may enter a short wait period (e.g., 30 seconds) pending entry of an access code through a keyboard of the alarm panel 24 by a person authorized to enter the premises 12. If the alarm panel 24 detects entry of the proper access code, then the alarm panel 24 may enter a disarmed state.

If, on the other hand, the wait period expires before entry of the proper access code, then a processor within the alarm panel 24 may compose an alarm message for transmission to the central monitoring station 14. The alarm message may contain at least the premises identifier, the communication system address of the alarm forwarding service 16 (as a destination address) and an identifier of the activated intrusion device.

As a first step in the alarm reporting process, the alarm message may be transferred to the cellular transceiver 28. The cellular transceiver 28 may scan for and locate a control channel of a local cellular base station. Once a control channel has been located, the cellular transceiver 28 may transfer the alarm message to the base station under an appropriate digital format (e.g., short message service (SMS), text message, general packet radio service (GPRS), 1XRTT, etc.).

Once received by the base station, the base station may transfer the alarm message to the alarm reporting service 16 either directly or through a wireline of a local or national public switch telephone network (PSTN) without any change in format. Alternatively, if the alarm reporting service 16 is not local to the base station and the base station has an Internet gateway associated with the base station, then the base station may transfer the alarm message to the alarm reporting service 16 as an Internet message.

In this case, the gateway may first use the telephone number of the alarm reporting service to identify a URL of the alarm reporting service 16. The gateway may then encapsulate the alarm message into a TCP/IP packet using the URL of the alarm reporting service 16 as the destination address of the packet and a URL of the gateway as a source address.

As such, the alarm message may be delivered to the alarm reporting service 16 under the original digital message or as an Internet message. Once received by the alarm reporting service 16, the alarm message may be processed by an alarm signal server 30. Within the alarm signal server 30, a first processor may recover the premises identifier from the alarm message. The processor may then cross-reference the premises identifier of the premises 12 to a communication system address (e.g., telephone number, URL, etc.) of the central monitoring station 14 via a lookup table.

Once identified, the processor may forward the alarm message to the central monitoring station 14. The processor may forward the alarm message under the original digital format or as a TCP/IP packet through a connection 50 with the central station 14 using a process similar to that discussed above.

The processor may also save a copy of the alarm message 34 in a memory for further processing. Further processing in this case means setting up a voice connection between the premises 12 and central monitoring station 14.

In this case, setting up of a voice connection may be necessary to confirm the alarm. The voice connection may be automatically set up by the alarm forwarding service 16.

To set up a voice connection, a call set up processor within a call controller/dialer bank 36 of the alarm reporting service may first retrieve the communication system address of the cellular transceiver 28. The communication system address may be obtained directly from the alarm message or from ANI infomation delivered along with the alarm message 34.

Once the communication system address of the cellular transceiver 28 has been obtained, the call set up processor may compose an acknowledgement (ACK) message for transmission to the cellular transceiver 28. In addition to simply acknowledging the alarm message 34, the ACK message may also include a communication system address (e.g., a telephone number, URL, etc.) of an available voice port of the alarm forwarding service 16. In the case where the voice port is to be a switched circuit connection identified by a telephone number, the call set up processor may interrogate a PABX 38 of the alarm forwarding service 16 to identify an available incoming telephone line and use the telephone number of the available line as the voice port identifier. Alternatively, if the voice port is to be a VoIP port, then the identifier would be a URL of a VoIP application within the call controller/PABX 38 of the alarm forwarding service 16. Once a voice port is identified, the call set up processor composes and sends the ACK message to the cellular transceiver 28.

Upon receipt of the ACK message, the cellular transceiver 28 retrieves the voice port address of the alarm reporting service 16, begins setting up of a voice channel between the cellular transceiver 28 and identified voice port of the alarm forwarding service 16. Setting up a voice channel means that the cellular transceiver 28 places a call to the alarm reporting service 16. The cellular transceiver 28 also connects the cellular transceiver end of the voice channel to a speaker and microphone combination of a speakerphone panel 26 within the premises 12.

In addition to sending the ACK message requesting a voice call connection, the set up processor may also initiate a voice connection to the central station 14. If the voice channel is intended to be via a switched circuit connection, then the set up processor instructs the PABX 38 of the alarm reporting service 16 to initiate a voice call to the PABX 40 of the central station 14. The PABX 38 may identify an available outbound line to the set up processor and places a call to the central reporting station 14. The set up processor may also send the telephone number of the outbound line (and identifier of the alarm message) to the alarm receiver 37.

Alternatively, if the voice connection is to be VoIP, then the set up processor may simply send a VoIP request to a VoIP application of the voice receiver/PABX 40 of the central station 14. Included within the VoIP request to the station 14 may be an identifier of the alarm message or of the premises from which the alarm message originated.

Within the central station 14, the alarm receiver 37 receives the alarm message 34(or alarm message along with the voice port identifier) and prepares to complete a voice connection with the premises 12. In this case, the alarm receiver 37 may forward the alarm message 34 to an automation server 42 and to the voice receiver/PABX 40. The automation server 42 causes the alarm message to be displayed on a computer terminal 46 of the attendant station 44.

Once the voice call has been identified within the voice receiver 40 (either through ANI or the alarm identifier), the voice connection is completed either to the telephone 48 of the attendant station 44 or to the VoIP application within the terminal 46 of the attendant station 44.

To complete the connection, the set up processor within the alarm reporting service 16 may first identify the incoming call from the cellular transceiver 28 via ANI information delivered along with the call in the case of a switched circuit call or via a source identifier if by a VoIP call request. Similarly, the set up processor may have already identified the switched circuit connection with the central station by information provided by the PABX 38 or by the VoIP port identifier of the controller/PABX 38 set up of the VoIP channel.

Once the communication port used for communicating with the cellular transceiver 28 and the communication port with the central station 14 has been identified the set up processor may transfer the connections to a three party conferencing device 52.

If the voice channel is a switched circuit connection, then the conferencing device 52 is simply a conferencing connection within the PABX 38. On the other hand, if the voice channel is accomplished under VoIP, then the conferencing device 52 is a router associated with the VoIP applications and that is associated with the call controller 38 where the router broadcasts VoIP packets to the respective destinations.

In use, the first and second ports of the three party conferencing device 52 are assigned to the cellular transceiver 28 and central station 14, respectively. The third port of the three party conferencing device 52 is routed or otherwise connected to a recording device 54.

In addition, the set up processor opens a file 56, 58 for receiving audio information regarding the alarm. The file 56, 58 may be identified by an identifier of the premises 12 or an account number and a time. In turn, the recording device 54 records two-way audio flowing through the connection between the premises and attendant and saves the audio in the recording files 56, 58.

Once an end-to-end connection has been established between the premises 12 and central monitoring station 14 have been set up, a call alerting signal (e.g., ringing) may be sent to the speakerphone panel 26. If a person answers the voice call, the person and central station attendant may begin conversing to either verify that the alarm is a false alarm or for the attendant to decide that the alarm is not a false alarm and for the attendant to summon the police.

By saving a copy of any exchange between the central station 14 and premises 12, investigators are provided with evidence that provides a basis for an attendant either reporting an alarm to the police or simply regarding the alarm as a false alarm. Moreover, since voice recordings are saved by account and time, it becomes relatively simple for investigators to retrieve information relative to voice exchanges between protected premises and central monitoring stations regarding alarms.

A specific embodiment of method and apparatus for recording a conversation between a central monitoring station and protected premises has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
    transmitting an alarm notification from a protected premises to an alarm routing service;
    the alarm routing service identifying a central monitoring station from the alarm notification and forwarding the alarm notification to the central monitoring station based upon the identification of the central monitoring station;
    the alarm routing service establishing a first voice connection between the protected premises and the alarm routing service and a second voice connection between the alarm routing service and the central monitoring station through a location of the alarm routing service in response to the alarm notification;
    the alarm routing service transferring the first and second voice connections to a three party conferencing device of the alarm routing service;
    the alarm routing service establishing an end-to-end connection between the protected premises and central monitoring station via the first and second voice connections within the three party conferencing device; and
    the alarm routing service recording, from the three party conferencing device, audio on the end-to-end connection between the protected premises and the central monitoring station.

2. The method as in claim 1 further comprising saving the recorded audio under an account number of the protected premises.

3. The method as in claim 1 further comprising using one of a short message service, a general packet radio service, 1XRTT and Internet Protocol to transmit the alarm notification to the alarm routing service.

4. The method as in claim 1 wherein the step of establishing the end-to-end connection further comprises the protected premises initiating a voice connection between the protected premises and the alarm routing service.

5. The method as in claim 4 wherein the step of initiating the voice connection between the protected premises and the alarm routing service further comprises the alarm routing service transferring a voice connection system address of the alarm routing service to the protected premises.

6. The method as in claim 5 wherein the step of transferring the voice connection system address of the alarm routing service to the protected premises further comprises defining the voice connection system address as a telephone number.

7. The method as in claim 4 wherein the step of establishing the end-to-end connection further comprises a dialer within the alarm routing service initiating a voice connection between the alarm routing service and central monitoring station.

8. The method as in claim 7 wherein the step of recording further comprises establishing a three party conference connection between the protected premises, the central monitoring station and a recorder.

9. An apparatus comprising:
    an alarm panel of a protected premises that transmits an alarm notification from the protected premises to an alarm routing service;
    a processor of the alarm routing service that identifies a central monitoring station from the alarm notification and forwarding the alarm notification to the central monitoring station based upon the identification of the central monitoring station;
    a processor within the alarm routing service that establishes a first voice connection between the protected premises and the alarm routing service and a second voice connection between the alarm routing service and the central monitoring station through a location of the alarm routing service in response to the alarm notification; the processor within the alarm routing service transferring the first and second voice connections to a three party conference device of the alarm routing service; the three party conference device of the alarm routing service that establishes an end-to-end connection between the alarm panel and central monitoring station via the first and second voice connections; and
    a recording device within the alarm routing service that records audio from the three party conferencing device on the end-to-end connection between the protected premises and the central monitoring station.

10. The apparatus as in claim 9 further comprising an account number that identifies the saved recorded audio.

11. The apparatus as in claim 9 wherein the alarm notification further comprising one of a short message service, a general packet radio service, 1XRTT and Internet Protocol.

12. The apparatus as in claim 9 wherein the processor that establishes the first and second voice connections further comprises a connection with a cellular transceiver within the protected premises that initiates a voice connection between the protected premises and the alarm routing service.

13. The apparatus as in claim 12 wherein the cellular transceiver that initiates the voice connection between the protected premises and the alarm routing service further comprises a connection with the processor within the alarm routing service that transfers a voice connection system address of the alarm routing service to the protected premises.

14. The apparatus as in claim 13 wherein the voice connection system address of the alarm routing service to the protected premises further comprises a telephone number.

15. The apparatus as in claim 12 wherein the processor that establishes the first and second voice connections is within a dialer within the alarm routing service that initiates a voice connection between the alarm routing service and central monitoring station.

* * * * *